(12) United States Patent
Yang et al.

(10) Patent No.: US 10,384,561 B2
(45) Date of Patent: Aug. 20, 2019

(54) ACTIVE DISCHARGE CIRCUIT FOR LINK CAPACITOR USING PHASE LEG SWITCHES

(71) Applicant: FORD GLOBAL TECHNOLOGIES, LLC, Dearborn, MI (US)

(72) Inventors: Shuitao Yang, Dearborn, MI (US); Yan Zhou, Canton, MI (US); Fan Xu, Novi, MI (US); Mohammed Khorshed Alam, Dearborn, MI (US); Lihua Chen, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 319 days.

(21) Appl. No.: 15/268,872

(22) Filed: Sep. 19, 2016

(65) Prior Publication Data

US 2018/0079315 A1  Mar. 22, 2018

(51) Int. Cl.
*B60L 11/00* (2006.01)
*B60L 11/10* (2006.01)
*B60L 11/18* (2006.01)
*H02M 7/46* (2006.01)
*B60L 50/14* (2019.01)
*H02M 7/5387* (2007.01)
*B60L 3/00* (2019.01)
*H02M 1/32* (2007.01)

(52) U.S. Cl.
CPC ............. *B60L 50/14* (2019.02); *B60L 3/0046* (2013.01); *H02M 7/46* (2013.01); *H02M 7/5387* (2013.01); *B60L 2210/40* (2013.01); *H02M 2001/322* (2013.01)

(58) Field of Classification Search
USPC .......................................... 307/9.1
See application file for complete search history.

(56) References Cited

U.S. PATENT DOCUMENTS

| 5,619,107 | A | 4/1997 | Shinohara et al. |
| 7,057,361 | B2 | 6/2006 | Kitahata et al. |
| 8,138,832 | B2 * | 3/2012 | Yu ........................ H03F 3/217 |
| | | | 330/207 A |

(Continued)

FOREIGN PATENT DOCUMENTS

| CN | 104626995 A | 5/2015 |
| KR | 100802679 B1 | 2/2008 |

*Primary Examiner* — Rexford N Barnie
*Assistant Examiner* — Xuan Ly
(74) *Attorney, Agent, or Firm* — David B. Kelley; MacMillan, Sobanski & Todd, LLC

(57) ABSTRACT

A DC link capacitor in a drive system for an electric vehicle is quickly discharged using only local action within an inverter module and without any extra components to dissipate the charge. The inverter has a phase leg comprising an upper switching device and a lower switching device coupled across the capacitor. A gate driver is coupled to the phase leg to alternately switch the switching devices to ON state according to a PWM signal during pulse-width modulation of the drive system. The gate driver is configured to discharge the link capacitor during a discharge event by simultaneously activating the upper and lower switching devices to transitional states. Thus use of transitional states ensures that the switching devices provide an impedance that dissipates the capacitor charge while protecting the devices from excessive temperature.

10 Claims, 5 Drawing Sheets

(56) References Cited

U.S. PATENT DOCUMENTS

| | | |
|---|---|---|
| 8,415,825 B2 | 4/2013 | Hirose |
| 2009/0195199 A1 | 8/2009 | Ito |
| 2010/0072942 A1* | 3/2010 | Kowalewski ........... H02P 27/04 |
| | | 318/809 |
| 2010/0327837 A1* | 12/2010 | Tsugawa ................ H02M 1/32 |
| | | 323/285 |
| 2011/0221370 A1* | 9/2011 | Fukuta ................... H02M 1/32 |
| | | 318/400.27 |

* cited by examiner

ACTIVE DISCHARGE CIRCUIT FOR LINK CAPACITOR USING PHASE LEG SWITCHES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to drive systems for electric vehicles, and, more specifically, to the rapid discharging of capacitors when shutting down the electric drive system.

Electric vehicles, such as hybrid electric vehicles (HEVs) and plug-in hybrid electric vehicles (PHEVs), use inverter-driven electric machines to provide traction torque and regenerative braking torque. The inverter module (i.e., the inverter system controller, or ISC) typically employs a relatively large energy storage capacitor as a main DC link to maintain a desired bus voltage and absorb switching related ripples. The DC link capacitor is usually interfaced with a high-voltage (HV) battery through a pair of mechanical contactors.

A shutdown of the electric drive system can be initiated by various events. During such a shutdown, the HV battery is quickly isolated from the rest of the electric system by opening the mechanical contractors. However, a HV electric charge will remain on the DC link capacitor. Due to safety requirements, the HV electric charge should be quickly discharged within a specific time. For example, U.S. Federal Motor Vehicle Safety Standards (FMVSS) may require that the voltage on the DC link capacitor must be less than 60V within 5 seconds in certain circumstances.

SUMMARY OF THE INVENTION

Even though the insulated gate bipolar transistors (IGBTs) or other field effect transistors (FETs) used as switching devices in the inverter phase legs are usually optimized for ON/OFF operation, they still must pass through a transition region when going from an OFF state to an ON state. In the transition region, the device will exhibit a certain impedance, which can be used by the present invention to limit the current amplitude. Thus, instead of using a prior art active resistor discharge (ARD) circuit to discharge the link capacitor, this invention adopts a fast discharging method that uses only inverter bridge. In some embodiments, the invention sends a continuous train of simultaneous, narrow pulses to both upper and lower IGBTs in at least one phase leg. The pulse width is controlled to be a small value (e.g., 300 ns) to limit the maximum circulating current to a certain value that can be used to discharge the capacitor quickly, while at the same time not causing any damage to the IGBTs. The invention can dissipate much more power more quickly than a typical ARD discharge resistor. The link capacitor voltage can be discharged to 60V within a very short time (e.g., 100 ms). Since no extra hardware is needed, the invention reduces cost significantly.

In one aspect of the invention, a drive system for an electric vehicle comprises a DC link capacitor adapted to be coupled to positive and negative DC busses between a DC power source and an inverter. The inverter has a phase leg comprising an upper switching device and a lower switching device coupled across the DC link, wherein a junction between the upper and lower switching devices is configured to be coupled to a load. A gate driver is coupled to the phase leg to switch the upper switching device to an ON state according to an upper gate PWM signal and to switch the lower switching device to an ON state according to a lower gate PWM signal during pulse-width modulation of the drive system. The gate driver is configured to discharge the link capacitor by simultaneously activating the upper and lower switching devices to transitional states. Thus use of transitional states ensures that the switching devices provide an impedance that dissipates the capacitor charge while protecting the devices from excessive temperature.

DETAILED DESCRIPTION OF PREFERRED EMBODIMENTS

Figure 1:
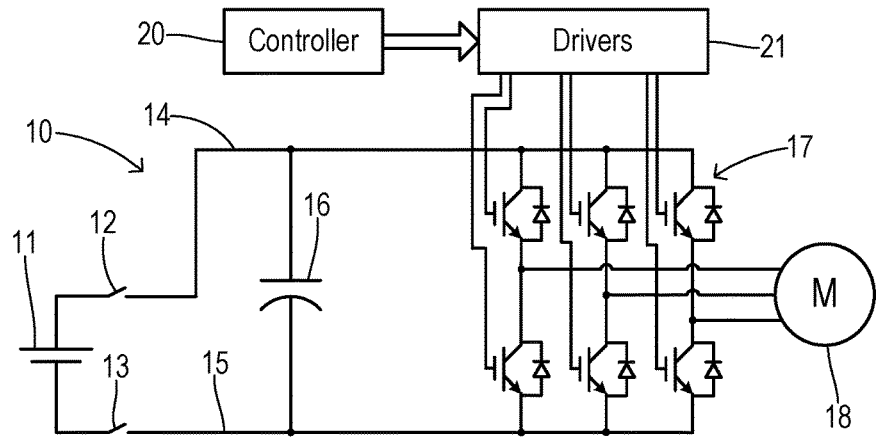
FIG. 1 is a schematic diagram showing one typical embodiment of an electric vehicle drive having a DC link capacitor.

Referring to FIG. 1, an electric vehicle drive system 10 includes a DC power source 11 (such as a battery pack or a fuel cell) coupled to contactor switches 12 and 13. Contactors 12 and 13 are preferably mechanical switches having an open state and a closed state for selectively coupling battery 11 to a positive bus 14 and a negative bus 15 of electric drive system 10.

A main capacitor (i.e., DC link capacitor) 16 is coupled between busses 14 and 15 along with an inverter 17. Inverter 17 includes a plurality of switching devices in a bridge configuration. The switches in inverter 17 are switched in a desired manner to drive a motor 18.

Each of the switching devices in inverter 17 is preferably comprised of an insulated-gate bipolar transistor (IGBT) or other power semiconductor switching device. Each IGBT includes a reverse-blocking diode. Each IGBT has a respective control (e.g., base) terminal coupled to a driver circuits 21 which are controlled by a controller 20 which generates switching commands according to various operating modes of the inverter.

Controller 20 may be a motor-generator control unit (MGCU), which is commercially available as a programmable device. In addition to handling pulse width modulation (PWM) control of the inverters, MGCU controller 20 can also control a discharge operation of link capacitor 16 that may commence when contactors 12 and 13 are opened. For example, the IGBTs can be pulse-width modulated according to an algorithm that pushes a flux-weakening current which results in zero torque while dissipating the charge on capacitor 16.

Figure 2:
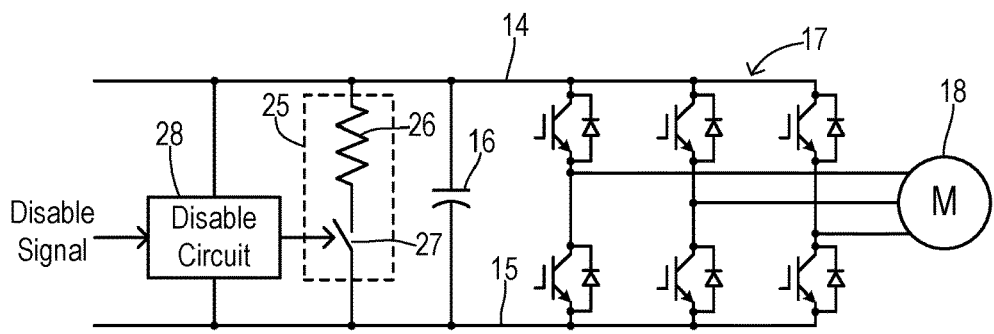
FIG. 2 is a schematic diagram showing a prior art active discharge resistor for discharging the DC link capacitor.

FIG. 2 shows a conventional active resistor discharge circuit 25 connected across link capacitor 16. Discharge circuit 25 comprises a discharge resistor 26 in series with a discharge switch 27. Switch 27 has a control terminal for selectably turning the discharge switch on and off via a disable circuit 28 in response to a disable command signal from the MGCU. The function of disable circuit 28 is to perform a logical inversion of the disable command signal. Thus, when the disable command signal has a high logic level, an output of disable circuit 28 connected to the control terminal has a low voltage level so that switch 27 is turned off (and capacitor 16 is not discharged). The low voltage level can be obtained by shunting the control terminal to negative bus 15, for example. When the disable command signal ceases (i.e., drops to a low logic level), the output of disable circuit 28 is automatically pulled up to a voltage sufficient to turn on discharge switch 27 and capacitor 16 is quickly discharged.

Figure 3:
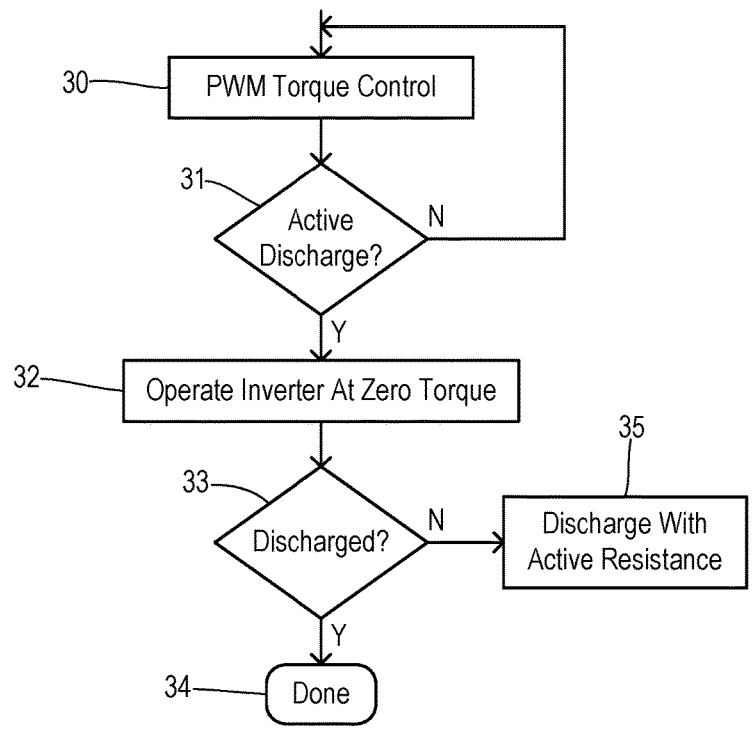
FIG. 3 is a flowchart showing a capacitor discharge procedure.

FIG. 3 shows one prior art method using a combination of link capacitor discharge mechanisms. Thus, in step 30 an inverter system controller may be operating in a normal PWM torque control mode wherein PWM signals having a controlled duty cycle are applied to an inverter bridge via respective gate drivers. A check is performed in step 31 to determine whether an active discharge event is needed, such as a vehicle shutdown. If not, then PWM torque control continues in step 30. Otherwise, a link capacitor discharge is first attempted with charge dissipation occurring externally of the inverter module by operating the inverter bridge to supply current from the link capacitor to the motor load in a manner that generates zero torque in step 32. A check is performed in step 33 to determine whether the link capacitor is becoming discharged in the expected manner. If so, then the algorithm may complete in step 34. If the link capacitor is not becoming discharged (e.g., where the motor has become disconnected from the inverter), then the inverter module may initiate an internal capacitor discharge using an active resistor in step 35. Prior art systems may also use just one or the other of the internal or external discharge techniques. In any case, the prior art systems are either costly as a result of added components, are computation intensive, and/or may be unable to discharge the link capacitor under certain conditions.

The present invention avoids the need for any extra components and is performed exclusively within the inverter system controller module where the DC link capacitor resides.

Figure 4:
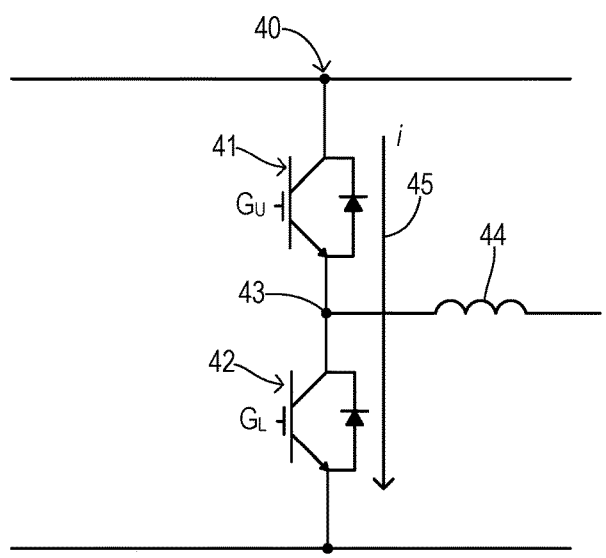
FIG. 4 is a schematic diagram depicting a shoot-through current at a phase leg of the inverter.

FIG. 4 shows a phase leg 40 in an inverter bridge comprising an upper switching device 41 and a lower switching device 42 connected in series and having a junction 43 for driving a motor winding 44. During normal PWM operation, a dead-time is adapted as part of the sequence of switching on and off switching devices 41 and 42 so that they are not simultaneously on (which would otherwise allow a "shoot-through" condition with a shoot-through current 45 flowing between the DC buses). Since the series impedance of switches 41 and 42 while in their ON state is very small, a shoot-through state may cause a very large currents to circulate in the bridge which could damage switching devices 41 and 42 (and which could result in significant power loss during normal PWM operation).

Figure 5:
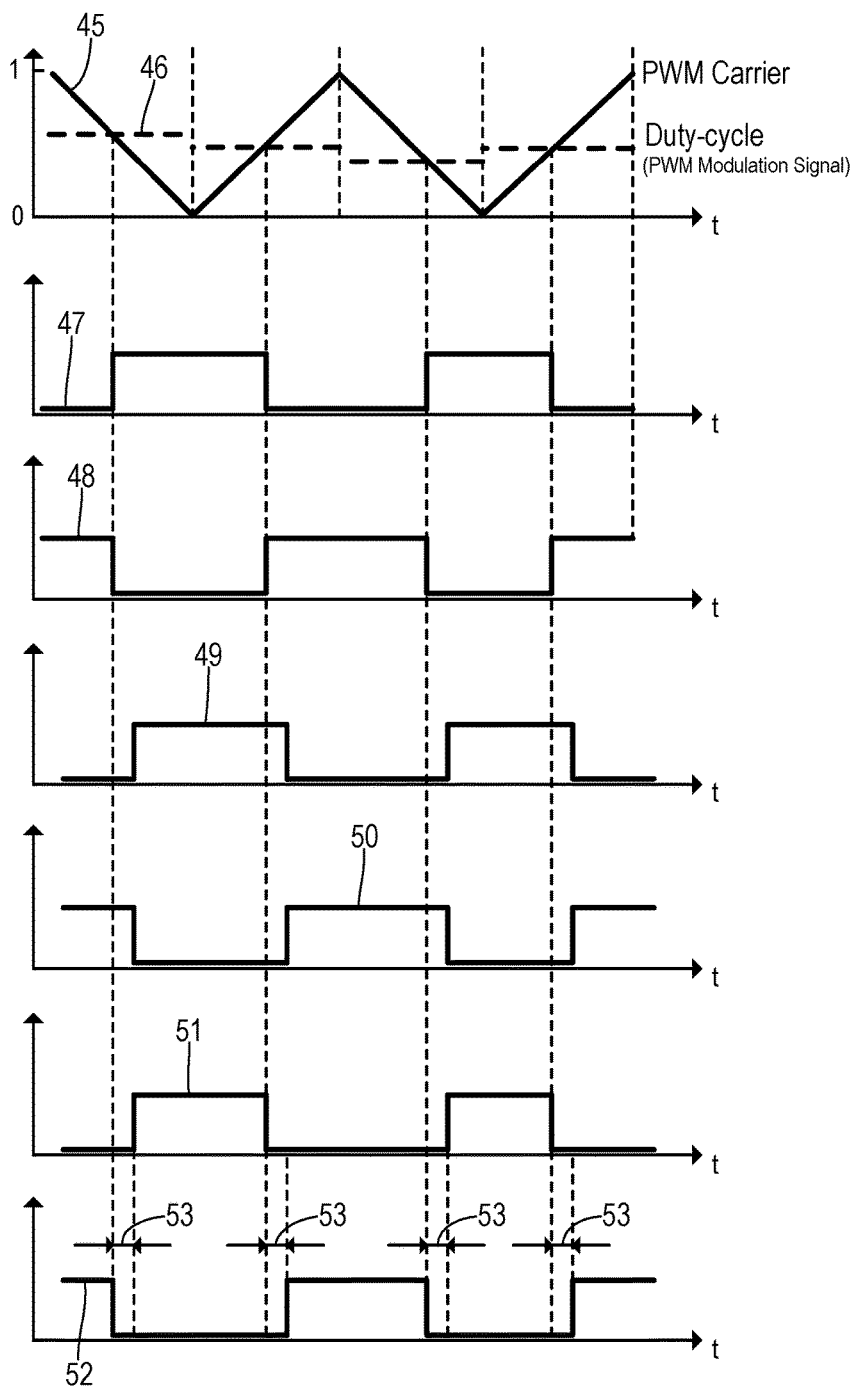
FIG. 5 shows a plurality of waveforms for generating PWM switching signals.

FIG. 5 shows a PWM carrier signal 45 which is generated as a triangular waveform at a high frequency (e.g., around 5 kHz) as compared to the rotation frequency of the motor. Using a known PWM method for generating gate-drive switching signals based on current-control, a PWM duty-cycle signal 46 is generated in response to any error between detected motor current/torque and a target motor current/torque. Duty-cycle 46 is compared with PWM carrier signal 45 to generate the PWM signals shown below in FIG. 5. For example, a signal 47 is an original upper device gate signal which has a low logic level when PWM carrier signal 45 is greater than duty cycle signal 46 and which has a high logic level when duty cycle signal 46 is greater than PWM carrier signal 45. A signal 48 shows an original lower device gate signal which is the logical inverse of signal 47. These original (i.e., nominal) gate signals can be generated other than by use of a PWM carrier signal, such as by direct numerical calculation.

To avoid shoot-through that could occur using original gate signals 47 and 48, a conventional dead-time insertion has been performed as follows. A waveform 49 is obtained by introducing a time delay (e.g., a fixed dead-time delay 53) into signal 47. The fixed time delay represents a sufficiently long dead-time insertion that avoids simultaneous activation of both upper and lower switching devices that could occur as a result of noise or propagation delay differences between the upper and lower gate signals (typically having a duration of several microseconds). A dead-time-inserted upper switching device gate signal ($G_U$) 51 is obtained by AND-gating (i.e., forming a logical AND) of original gate signal 47 and delayed gate signal 49. A signal 51 shows a time delayed version of lower gate signal 48 using the same fixed delay 53. A dead-time-inserted lower switching device gate signal ($G_L$) 52 is generated as a logical AND of original lower device gate signal 48 and delayed signal 50. In the prior art, dead-time inserted upper and lower gate signals 51 and 52, respectively, have been used to drive the phase leg switching devices without creating any shoot-through (e.g., as shown by gate signals $G_U$ and $G_L$ coupled to the gate terminals of switching devices 41 and 42 in FIG. 4).

Figure 6:
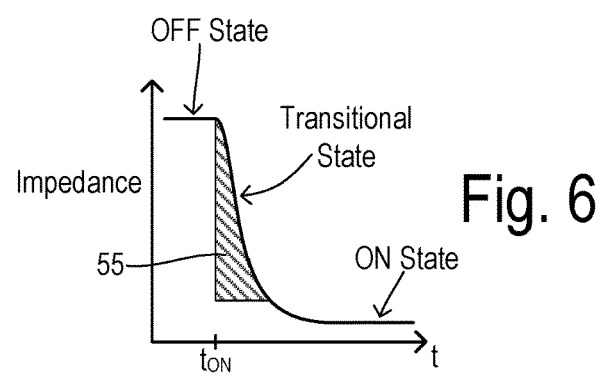
FIG. 6 is a waveform plot depicting an output impedance of a power switching device while switching from an off state to an on state.

While the on/off levels of the gate signals in FIG. 5 are shown as changing instantaneously, the actual transition of a switching device proceeds as shown in FIG. 6. Device impedance has a maximum value while in an OFF state and a minimum value in an ON state. Upon receiving a gate drive signal above a threshold occurring at a time $t_{ON}$, the switching device passes through a transitional state during which an impedance region 55 is obtained that is capable of dissipating charge from the link capacitor. By maintaining operation within this region for a sufficient aggregation of time, the link capacitor can be very effectively discharged.

Figure 7:
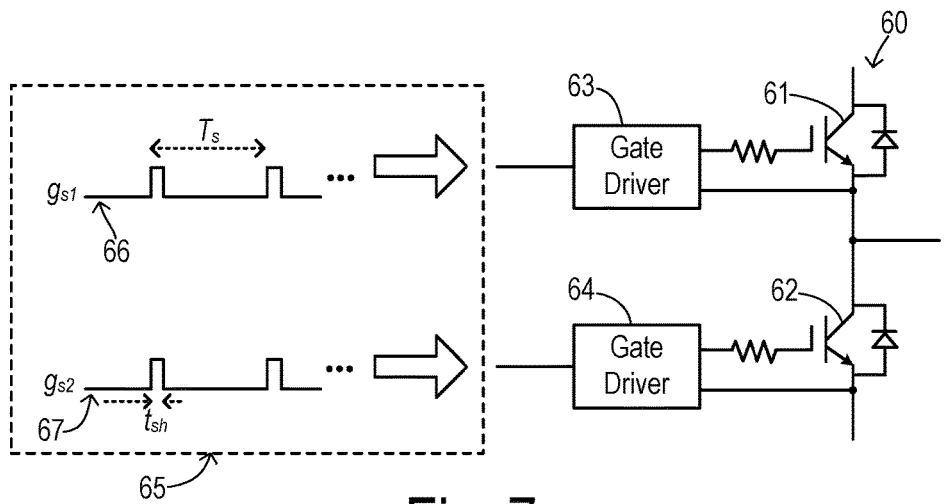
FIG. 7 is a schematic diagram of a phase leg showing gate switching signals for discharging the link capacitor according to one embodiment of the invention.

FIG. 7 shows a phase leg 60 adapted to discharge a link capacitor according to one embodiment of the invention. Upper and lower switching devices 61 and 62 are coupled across the link capacitor (not shown) with a junction between switches switching devices 61 and 62 configured to be coupled to the output load. Switching devices 61 and 62 are coupled to gate drivers 63 and 64 respectively in a conventional manner. Collectively with a controller 65, the gate drivers are configured to discharge the link capacitor by simultaneously activating switching devices 61 and 62 into transitional states (i.e., at less than their full ON states) whenever a discharge event is detected in which the main buses are decoupled from the main DC power source by opening of the contactor switches. By using a transitional state, switching devices 61 and 62 operate with an impedance that can safely dissipate the charge stored on the link capacitor. In order to prevent the buildup of temperatures that could damage devices 61 and 62, the transitional states may be modulated to limit the discharge current.

In the embodiment of FIG. 7, switching devices 61 and 62 are kept in transitional states by configuring the gate signals as a pair of synchronous trains of narrow pulses, with each pulse being shorter than the turn-on time of the devices. Thus, a timing block 65 generates synchronous pulse trains 66 and 67, wherein each pulse has a pulse width $t_{sh}$ shorter than the turn on time of the respective device and wherein pulses are provided at a frequency which is configured to discharge the link capacitor within a predetermined time while maintaining a temperature of the switching devices below a predetermined temperature. The frequency corresponds to a period $T_s$ between adjacent pulses in pulse trains 66 and 67. The "off time" between pulses limits the total current (and thereby the total heat generation) by ensuring that there is insufficient charge delivered to the respective gates of the switching devices to achieve their ON states. In a preferred embodiment, the pulse width and pulse frequency of the synchronous pulse trains are fixed at predetermined values. The predetermined values may be determined empirically or by modeling, and are selected to ensure that a maximum junction temperature for the respective switching devices at a maximum discharge current during the discharging process remains below a maximum allowed junction temperature (e.g., about 150° C.) as specified by the manufacturer of a particular device.

The use of simultaneous device switching using synchronous pulse trains as shown in FIG. 7 is very effective in quickly discharging a link capacitor. For example, a link capacitor can be discharged from 400 V to less than 60 V in less than 100 ms. The invention can also be applied to two or more inverter phase legs in order to dissipate a charge from the link capacitor even more quickly. If heat generation becomes an issue, then use of a plurality of phase legs can spread the heat over a large number of devices. Since the switching devices of the inverter bridge may typically include passive or active cooling, the present invention can take advantage of an already existing heat sink to aid in discharging the link capacitor.

Figure 8:
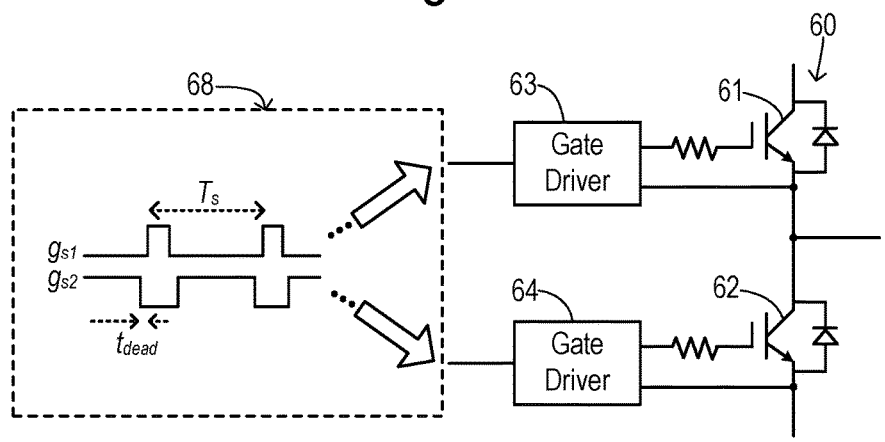
FIG. 8 is a schematic diagram of a phase leg showing gate switching signals for normal PWM operation.

Instead of synchronous, narrow pules, the switch timing of the invention can alternatively be obtained using a modification to convention PWM signal generation. FIG. 8 shows phase leg 60 and gate drivers 63 and 64 connected to a PWM signal block 68 generating conventional PWM gate signals using an inserted dead time $t_{dead}$ to generate gate signals $g_{s1}$ and $g_{s2}$ provided to gate drivers 63 and 64, respectively. The PWM carrier frequency resulting in a period $T_{s1}$ for the gate signals. During the dead time, both switching devices are in their OFF state. During the remainder of the PWM period, one switching device is in the ON state and the other switching device is in the OFF state.

Figure 9:
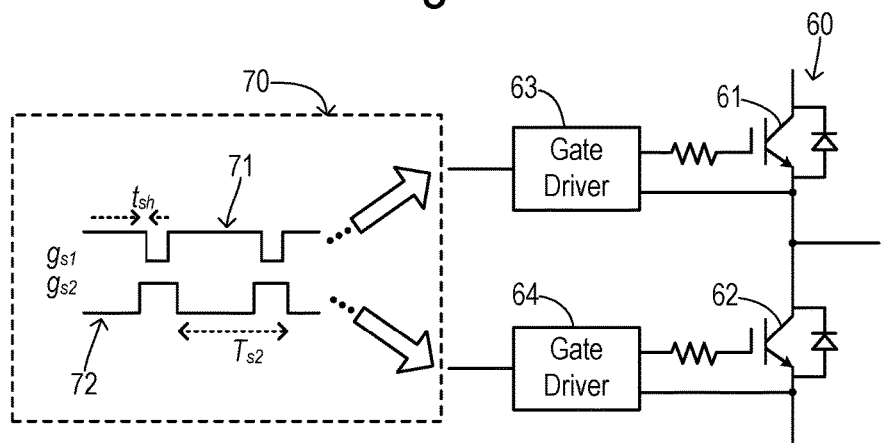
FIG. 9 is a schematic diagram of a phase leg showing gate switching signals for discharging the link capacitor according to another embodiment of the invention.

FIG. 9 shows a simple modification to the generation of PWM switching signals that can be used to simultaneously activate the upper and lower switching devices in their transitional states to achieve the same result as the embodiment of FIG. 7. Specifically, the gate signals generated by block 68 in FIG. 8 are inverted in a signal timing block 70 in order to generate inverse-dead-time signals 71 and 72. By inverting the normal PWM signals, the inverse-dead-time signals 71 and 72 have a high logic level voltage to turn on the switching devices simultaneously during the time corresponding to the original dead time, and at all other times one of the switching devices will always being in the OFF state. Thus, the inverse-dead-time signals generate a shoot-through of the phase leg during the moments that correspond to the dead time. Therefore, current flows through the upper and lower switching devices during the brief intervals periods when both gate signals are at a high voltage level (which again is too short to obtain the ON state in whichever device is being newly activated), thereby quickly dissipating the charge from the link capacitor. Signal block 70 may employ the same length of the dead time pulse width $t_{sh}$ in order to simplify the implementation. Likewise, the same PWM frequency (i.e., period) can be used, or a different predetermined period $T_{s2}$ could be used in order to obtain a desired discharge profile that limits the temperature to less than a predetermined temperature.

Figure 10:
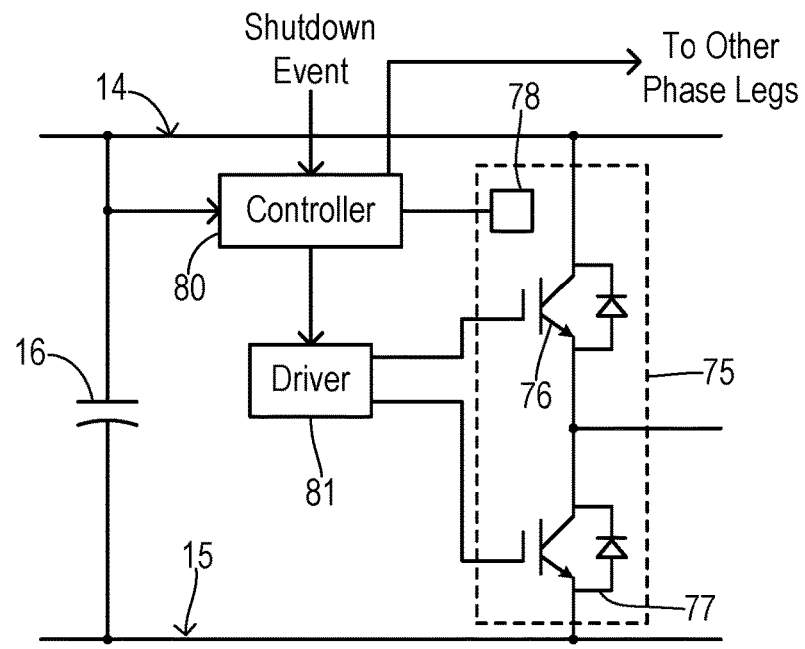
FIG. 10 is a schematic, block diagram showing one embodiment of a control system of the present invention.
Figure 11:
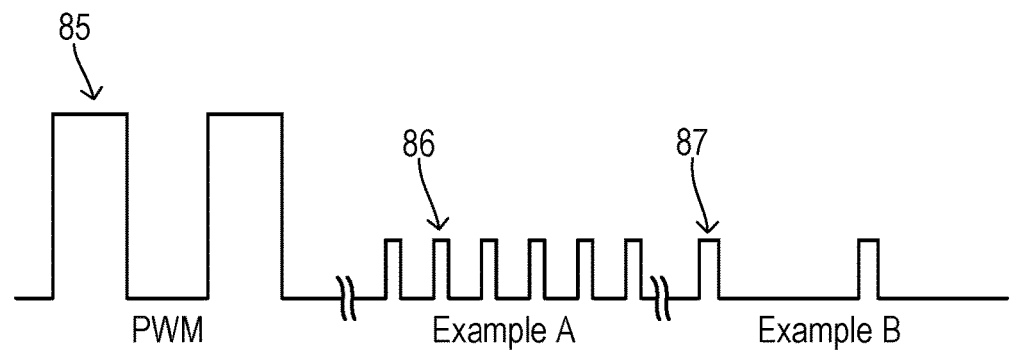
FIG. 11 is a waveform diagram comparing gate signals during PWM operation with examples of pulse trains for discharging the link capacitor.

FIG. 10 shows a further embodiment of the invention wherein upper and lower switching devices 76 and 77 are activated using gate signals having an amplitude too small to obtain the ON state (i.e., directly controlling devices 76 and 77 to conduct within their transition regions). A typical switching device may be configured to obtain its full ON state with a gate voltage of 15 V. For such a device, a transition gate voltage of about 6 V might be used. Since devices 76 and 77 are optimized for full ON/OFF switching due to their main purpose in an inverter bridge, the size of the transition regions may be relatively small compared to other types of switching devices. Therefore, the amplitude of the gate signals may need to be finely controlled. It may be preferable to use the decreased amplitude of the gate signals together with pulsing of the gate signals. For example, FIG. 11 shows regular PWM gate signals 85 having a full amplitude configured to drive the switching devices to their ON states. In example A, a pulsed gate signal 86 has a reduced amplitude that (when simultaneously provided to both devices in the phase leg) provides a limited current through the phase leg to discharge the link capacitor. If the pulse repetition frequency in Example A would generate a device temperature greater than a specified temperature, then the pulse repetition frequency could be decreases as shown by gate signal 87 in Example B.

As shown in FIG. 10, switching devices 76 and 77 can be fabricated on a common semiconductor die and packaged as a power module 75. Temperature of module 75 may be monitored with an on-chip temperature sensor 78 providing a temperature signal to a controller 80. Controller 80 is connected to gate driver 81 which controls the switching of devices 76 and 77 as described above. A shutdown detection signal may be provided to controller 80. Controller 80 or some other controller in the electrified vehicle opens the main battery contactor switches when a shutdown is detected. In response to the shutdown, controller 80 provides gate signals to driver 81 which are configured to discharge link capacitor 16 according to any of the foregoing embodiments. Using the temperature signal from sensor 78, controller 80 could further regulate the discharge current to maximize the speed of discharge without creating an undesirable temperature increase. The discharge current can be controlled by varying the frequency of the synchronous pulse trains such that if the temperature becomes too high then the frequency of the discharge pulses is decreased, for example.

What is claimed is:

1. A drive system for an electric vehicle, comprising:
a DC link capacitor adapted to be coupled to positive and negative DC busses between a DC power source and an inverter;
a phase leg comprising an upper switching device and a lower switching device coupled across the DC link, wherein a junction between the upper and lower switching devices is configured to be coupled to a load;
a gate driver coupled to the phase leg to switch the upper switching device to an ON state according to an upper gate PWM signal and to switch the lower switching device to an ON state according to a lower gate PWM signal during pulse-width modulation of the drive system, wherein the gate driver is configured to discharge the link capacitor by simultaneously activating the upper and lower switching devices to transitional states, and wherein the gate driver discharges the link capacitor by simultaneously switching the upper and lower switching devices according to synchronous pulse trains having a gate voltage corresponding to the ON state and a duration that is too short to obtain the ON state.

2. The system of claim 1 wherein the pulse trains have a frequency configured to discharge the link capacitor within a predetermined time while maintaining a temperature of the switching devices below a predetermined temperature.

3. The system of claim 2 wherein the frequency is fixed.

4. The system of claim 1 wherein the gate driver discharges the link capacitor by switching the upper and lower switching devices according to inverse-dead-time signals that activate both upper and lower switching devices during periods having a duration that is too short to obtain the ON state.

5. The system of claim 4 wherein the inverse dead-time signals have a frequency configured to discharge the link capacitor within a predetermined time while maintaining a temperature of the switching devices below a predetermined temperature.

6. The system of claim 5 wherein the frequency is fixed.

7. A method of rapid discharge of a DC link capacitor in drive system for an electric vehicle, wherein the drive system includes positive and negative DC busses coupled to a DC power source by contactor switches, and wherein the link capacitor and a plurality of inverter phase legs are connected to the busses, the method comprising:
detecting a discharge event wherein the busses are decoupled from the power source by the contactor switches;
driving upper and lower switching devices in at least one phase leg with gate signals that simultaneously activate the upper and lower switching devices to transitional states, wherein the gate signals are configured to discharge the link capacitor within a predetermined time while limiting a current through the switching devices that maintains a temperature of the switching devices below a predetermined temperature, and wherein the gate signals are comprised of synchronous pulse trains having a gate voltage corresponding to the ON state and a duration that is too short to obtain an ON state of the switching devices.

8. The method of claim 7 wherein the gate signals are comprised of inverse-dead-time signals that activate both upper and lower switching devices during periods having a duration that is too short to obtain an ON state of the switching devices.

9. A capacitor discharge system, comprising:
a phase leg of an inverter comprising upper and lower switching devices configured to invert a DC voltage from a link capacitor to an AC voltage for driving a motor; and
a gate driver simultaneously activating the upper and lower switching devices to transitional states to discharge the link capacitor within a predetermined time during a discharge event while maintaining the switching devices below a predetermined temperature, wherein the transitional states are comprised of simultaneously switching the upper and lower switching devices according to synchronous pulse trains having a gate voltage corresponding to the ON state and a duration that is too short to obtain an ON state of the switching devices.

10. The system of claim 9 wherein the transitional states are comprised of switching the upper and lower switching devices according to inverse-dead-time signals that activate both upper and lower switching devices during periods having a duration that is too short to obtain an ON state of the switching devices.

* * * * *